Nov. 26, 1940. C. V. JOHNSON 2,222,844
SHOCK STRUT
Filed Aug. 9, 1939

INVENTOR.
CARL V. JOHNSON
BY M. W. McConkey
ATTORNEY.

Patented Nov. 26, 1940

2,222,844

UNITED STATES PATENT OFFICE 2,222,844

SHOCK STRUT

Carl V. Johnson, South Bend, Ind.

Application August 9, 1939, Serial No. 289,097

3 Claims. (Cl. 267—64)

This invention relates to shock struts, and is illustrated as embodied in a strut intended to absorb the force of landing an airplane.

In such struts, oil is forced under high pressure through an orifice to absorb the energy of landing by converting it into heat in the liquid used in the strut. Where the liquid from the orifice discharges freely into the compressed air therein, it tends to spurt up into the air chamber and produce a mist of mixed air and oil. When this mixture is later drawn back through the orifice into the hydraulic chamber of the strut, there is a tendency to cause foaming, thereby reducing the density of the liquid.

An object of the present invention is to prevent this breaking up of the oil as it issues from the orifice, by discharging it against a deflector spaced far enough away not to interfere with the passage of the oil through the orifice, and which deflects the oil radially outward. Preferably the deflector is conical in form, with its apex facing and alined with the center of the orifice.

The above and other objects and features of the invention will be apparent from the following description of the illustrative embodiment shown in the accompanying drawing, in which.

Figures 1, 2, 3:
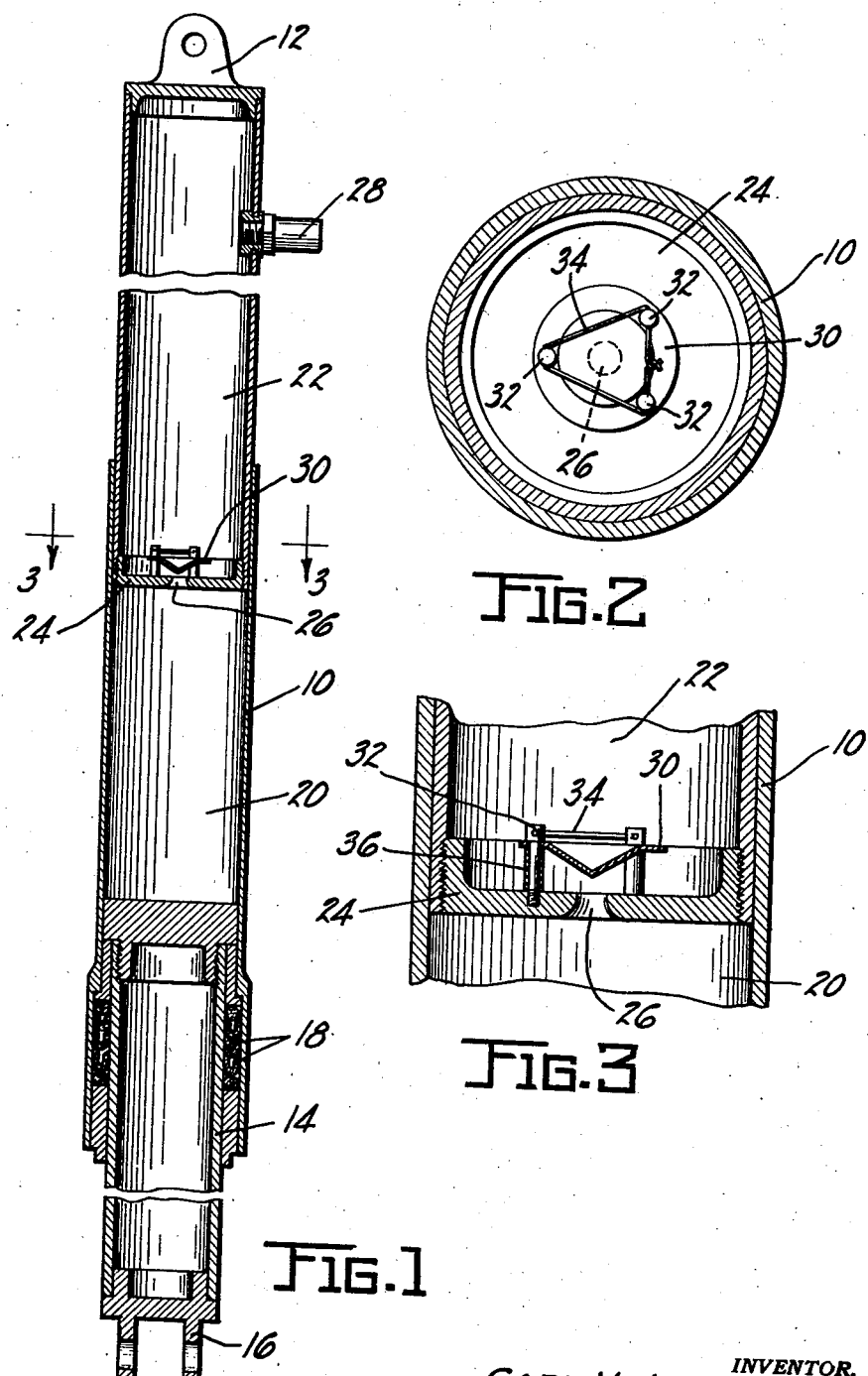
Figure 1 is a section longitudinally through a shock strut embodying my invention.
Figure 2 is an enlarged section of the part provided with the orifice and the deflector.
Figure 3 is a cross section on the line 3—3 of Figure 1 showing in top plan view the parts appearing in Figure 2.

The airplane shock strut shown in the drawing comprises a cylinder 10, having an attachment fitting 12 at its closed upper end, and a hollow piston 14 having a head slidable in the cylinder and having an attachment fitting 16 at its lower end. The piston moves in a suitable packing 18. The cylinder may be made in one piece, or by welding together two interfitting pieces of tubing as shown, and is divided into a hydraulic chamber 20 and a compressed air chamber 22 by a diaphragm or rigid partition 24 formed with an orifice 26. A fitting 28 may be provided for introducing compressed air.

In the operation of this shock strut, on landing the plane the piston 14 is forced upwardly, forcing oil or other liquid from the hydraulic chamber 20 upwardly through the orifice 26 into the air chamber 22.

In order to prevent the undesired breaking up and foaming of the liquid, a deflector 30 is mounted at the upper side of the orifice 26. As shown, this deflector is mounted on the partition 24 by headed screws 32 locked against turning by a wire 34 passed through openings in their heads. It is spaced away from the orifice 26 by spacers 36 sleeved on the screws 32, sufficiently to insure that the deflector will not interfere with the passage of the liquid through the orifice 26. Preferably the deflector 30 is conical, with its apex facing toward and alined with the center of the orifice 26.

The deflector 30, formed and arranged as described above, deflects the liquid radially outward, as it issues from the orifice 26, thereby minimizing breaking up and foaming.

While one illustrative embodiment has been described in detail, it is not my intention to limit the scope of the invention to that particular embodiment, or otherwise than by the terms of the appended claims.

I claim:

1. A shock strut having a hydraulic chamber and an air chamber separated by a part formed with an orifice, means for forcing liquid from the hydraulic chamber to the air chamber through said orifice to absorb energy, and a deflector mounted on the air chamber side of said orifice and spaced from the orifice far enough not to interfere with the passage of liquid and formed to deflect liquid from the orifice radially outward.

2. A shock strut having a hydraulic chamber and an air chamber separated by a part formed with an orifice, means for forcing liquid from the hydraulic chamber to the air chamber through said orifice to absorb energy, and a deflector mounted on the air chamber side of said orifice and spaced from the orifice far enough not to interfere with the passage of liquid and formed to deflect liquid from the orifice radially outward, said deflector being conical in form with its apex facing and alined with the center of said orifice.

3. In a shock strut having a hydraulic chamber and an air chamber separated by a part formed with an orifice and means for forcing liquid from the hydraulic chamber to the air chamber through said orifice to absorb energy, a deflector mounted on the air chamber side of said orifice and spaced from the orifice far enough not to interfere with the passage of liquid and formed to deflect liquid from the orifice radially outward, said deflector being conical in form with its apex facing and alined with the center of said orifice.

CARL V. JOHNSON.